Sept. 14, 1948.   P. R. MURRAY   2,449,084
REMOTE CONTROL SYSTEM FOR AIRCRAFT
LANDING GEAR AND LANDING FLAPS
Filed Aug. 1, 1945
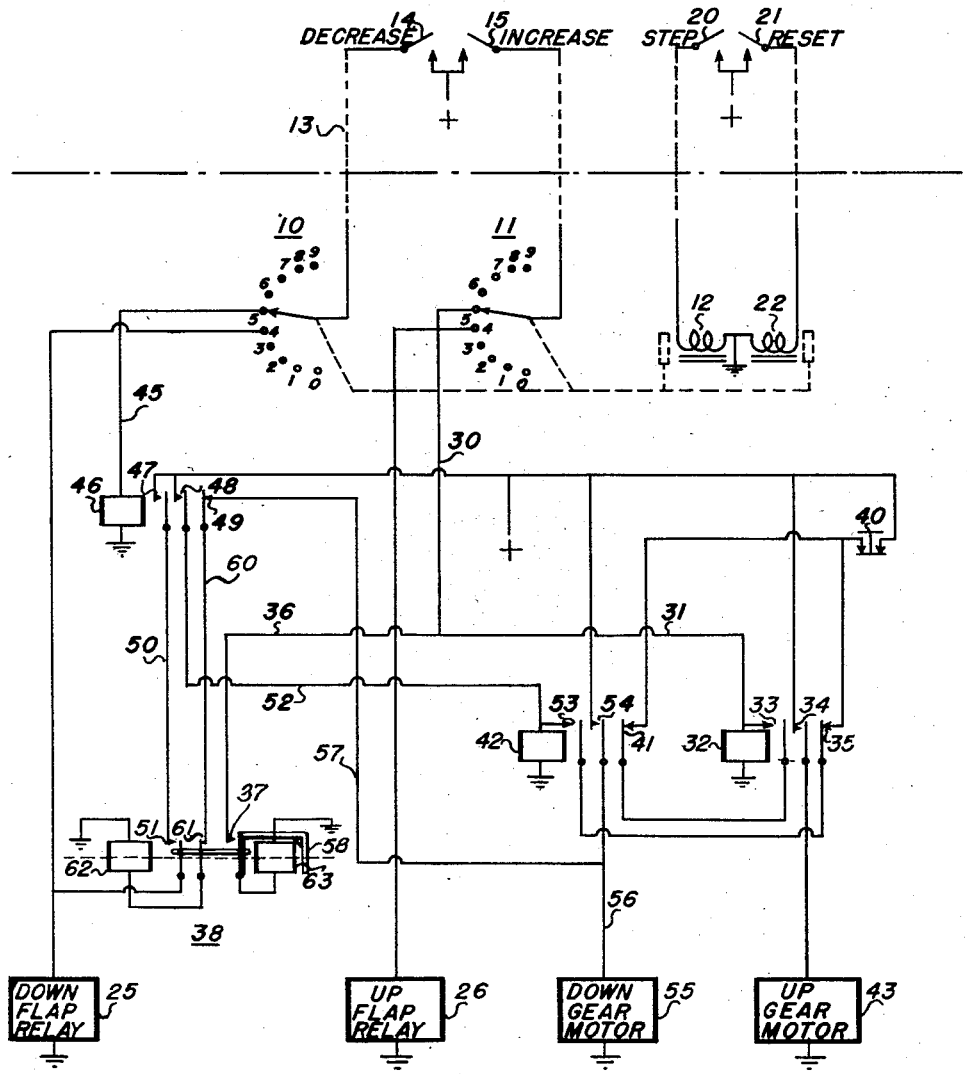
INVENTOR
PETER R. MURRAY
*William D. Bell*
ATTORNEY Patented Sept. 14, 1948

2,449,084

UNITED STATES PATENT OFFICE 2,449,084

REMOTE CONTROL SYSTEM FOR AIRCRAFT LANDING GEAR AND LANDING FLAPS

Peter R. Murray, Dayton, Ohio

Application August 1, 1945, Serial No. 608,347

3 Claims. (Cl. 244—42)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical control devices and particularly to such devices in which a selection of an operational function to be performed is combined with a selection of the manner in which such a function is to be carried out.

Broadly, it is an object of the present invention to simplify the steps involved in carrying out the selected functions in certain cases.

The present invention is particularly, though not exclusively adapted for use in conjunction with remote control equipment of the character disclosed in the copending application of Peter R. Murray and Donald C. Bright (A-58), Serial No. 558,708, filed October 14, 1944. In the aforesaid equipment there are provided certain stepper switches and function-selecting switches which are operated in various combinations for causing the controlled apparatus, such as a pilotless aircraft, to perform the desired functions. One of the step positions of the stepper switches relates to the wing flaps of the aircraft while another step position thereof pertains to the landing gear. Operation of an "increase" or "decrease" switch while the stepper switches are in the "flap" step position causes the flaps to be raised or lowered as the case may be. On the other hand, operation of an "increase" or "decrease" switch while the stepper switches are in the "gear" step position serves to raise or lower the landing gear.

There may be instances in which it is desired to maintain the stepper switches in a particular step position and successively select different functions by repeated operation of the same function-selecting switch. Specifically, it has been found desirable to so arrange the controlled apparatus that two successive operations of the "decrease" switch while the stepper is in the "gear" step position cause the landing gear and flaps to be lowered in the sequence indicated. This avoids the necessity of stepping the stepper switches from "gear" to "flap" positions on landing. The usual flap control should remain available in the regular "flap" step position. To accomplish the foregoing, therefore, is another object of this invention.

Other and further objects will be apparent from the following description taken in connection with the accompanying drawing which presents a schematic illustration of the present invention. The figure is an electrical diagram of the invention as applied to wing flaps and landing gear.

For purposes of explanation, the present invention is disclosed as being applied to a remotely controlled aircraft which has several controllable functions including operation of the wing flaps and landing gear. The pertinent portions of such a remote control system are illustrated in the drawing. That part of the equipment which is embodied in the pilotless aircraft is shown below the dot-dash line in the drawing. This apparatus includes stepper switches 10 and 11, each having a set of serially numbered contacts. The movable contact arms of the switches 10 and 11 are mechanically interconnected for gang operation under control of a stepping solenoid 12. Following the scheme set forth in the aforesaid copending application of Murray and Bright, the No. 4 step position of the switches 10 and 11 relates to the operation of the wing flaps while the No. 5 step position pertains to operation of the landing gear.

Certain function-selecting switches, shown above the dot-dash line in the drawing, are disposed at the control station where they are adapted to be actuated by the remote control operator. An operative connection, indicated by the partially broken line 13, extends from the movable contact of the stepper switch 10 to a "decrease" switch 14. It will be understood that such interconnection may be effected through the medium of radio transmitting and receiving equipment, a particular radio channel being assigned to the "decrease" function. Similarly, an "increase" switch 15 is operatively connected to the movable contact of the stepped switch 11. A "step" switch 20, when actuated, serves to energize the stepping solenoid 12 for advancing the movable contacts of the stepper switches 10 and 11 one step for each actuation of the switch 20. A "reset" switch 21 is provided for energizing a reset solenoid 22 when it is desired to reset the stepper switches 10 and 11 to their home positions.

The No. 4 contacts of the stepper switches 10 and 11 are electrically connected to a "down" flap relay 25 and an "up" flap relay 26, respectively. When the switches 10 and 11 are in their No. 4 step positions, actuation of the decrease switch 14 serves to energize the down flap relay 25 to effect lowering of the wing flaps. Actuation of the increase switch 15 under these circumstances brings about energization of the up flap relay 26 for raising the flaps.

When the stepper switches 10 and 11 are in their No. 5 step positions, actuation of the increase switch 15 causes a circuit to be established from a suitable positive voltage source (which actually is provided locally in the controlled aircraft although diagrammatically shown as being supplied at the control station) through the switch 11, conductors 30 and 31 and winding of a relay 32 to ground. Relay 32 thereupon energizes, closing its contacts 33 and 34 and opening a contact 35. In the just described operation positive potential is also applied through the switch 11 and conductors 30 and 36 to a contact 37 associated with a latching relay 38, which will be described in greater detail presently, but this action is without effect in the present instance.

Closure of relay contact 33 as just described establishes a holding circuit for relay 32, this circuit extending from a positive voltage source through a normally closed push button 40 and a normally closed contact 41 of a relay 42, at present in a deenergized condition, thence through the relay contact 33 and winding of relay 32 to ground. Relay 32 is thus held energized until either relay contact 41 or push button 40 is opened. Opening of relay contact 35 is without effect in the present instance. Closure of relay contact 34 extends circuit from a positive voltage source to a motor 43 which operates to raise the landing gear. A suitable limit switch is embodied in this motor to arrest operation thereof when the landing gear has been fully retracted. The relay 32 is maintained in energized condition until released in a subsequent gear lowering operation or by manual actuation of the push button 40.

To lower the landing gear the decrease switch 14 is momentarily actuated while the stepper switches 10 and 11 are in their No. 5 position. This is effective to apply positive potential through the stepper switch 10 and a conductor 45 to the winding of a relay 46, which thereupon energizes to close its contacts 47 and 48 and open its contact 49. Opening of contact 49 is without effect in the present instance. Closure of relay contact 47 is likewise without effect other than to apply positive potential through a conductor 50 to a normally open contact 51 of the latching relay 38. Closure of relay contact 48 extends circuit from the positive source through a conductor 52 and winding of relay 42 to ground. Relay 42 energizes, closing its contacts 53 and 54 and opening its contact 41. Opening of contact 41 serves to break the holding circuit for relay 32, if such a holding circuit was previously established; otherwise it is of no effect. Relay contact 53 is connected to the conductor 52 leading to the winding of relay 42; hence there is established a holding circuit for relay 42 from the positive source through push button 40, normally closed contact 35 of relay 32, and contact 53 to the winding of relay 42. Thereafter relay 42 remains energized until either relay contact 35 or push button 40 is opened. Closure of relay contact 54 supplies positive potential through a conductor 56 to a motor 55 which operates to lower the landing gear, this motor likewise having a suitable limit switch incorporated therein. A conductor 57 connects the conductor 56 to the contact 49 of relay 46 for a purpose which will appear presently.

In effecting the gear-lowering operation described above, the decrease switch 14 was depressed momentarily to establish circuits for energizing and locking up the relay 42. Upon release of the switch 14 the relay 46 deenergizes and opens its contacts 47 and 48, closing its contact 49. The opening of contact 47 is without effect in the present instance. The opening of contact 48 is likewise without effect inasmuch as a holding circuit has been established for the relay 42. Closure of contact 49 completes a circuit from the potentialized conductor 56 through conductor 57, contact 49, a conductor 60, a normally closed contact 61 of the latching relay 38, and thence through a coil 62 of the relay 38 to ground. Coil 62 energizes and actuates the contacts of relay 38 to effect closure of contacts 51 and 37 and opening of contacts 61. The contacts are latched in these positions by mechanical means 58 while coil 62 deenergizes due to opening of the contact 61.

Closure of relay contact 51, as just described, conditions a circuit to the down flap relay 25. To operate this relay the decrease switch 14 is depressed a second time, the stepper switch 10 still being in the No. 5 position, whereupon relay 46 energizes to close its contact 47 and thereby complete a circuit through the conductor 50 and relay contact 51 to the relay 25 which operates to lower the wing flaps.

When contact 37 of relay 38 was closed and latched, it conditioned a circuit to the coil 63 of relay 38. Energization of this coil does not take place, however, until an ensuing gear-raising operation. At such time as it is desired to raise the landing gear, the increase switch 15 is depressed while the stepper switch 11 is in its No. 5 position, thereby closing a circuit through the switch 11, conductors 30 and 36, relay contact 37 and the coil 63 of relay 38. Coil 63 energizes and releases the relay contacts 51 and 37, which thereupon open, also causing the relay contact 61 to close. This cancels the previous setting of the relay 38 and restores the contacts to their positions as shown in the drawing. Closure of the increase switch 15 furthermore establishes a circuit through switch 11 and conductors 30 and 31 to the winding of relay 32 for energizing this relay. Contact 35 of relay 32 opens to break the holding circuit for relay 42, assuming that such holding circuit has not previously been interrupted. Relay contact 33 closes to establish a holding circuit for relay 32. Relay contact 34 closes circuit to the up gear motor 43 which operates to raise the landing gear. It will, of course, be understood that the wing flaps are raised at the appropriate time by actuation of switch 15 while the stepper switch 11 is in its No. 4 position.

From the foregoing description it is apparent that the present invention materially simplifies the operations of lowering the landing gear and flaps of the pilotless aircraft, in that the decrease switch 14 is merely depressed twice in order to effect these two operations, the stepper switch 10 remaining in the same step position (No. 5) throughout. Normal flap operation without actuation of the landing gear is still available in the No. 4 step position.

While there has been illustrated and described what is at present considered to be the preferred embodiment of this invention, it will be obvious to those skilled in the art that various changes and modifications can be made therein without departing from the scope of the invention.

What is claimed is:

1. In a system for the remote control of an aircraft or the like equipped with means alternatively operable for raising and lowering the landing gear of the aircraft and other means alternatively operable for raising and lowering the flaps of the aircraft, said system including means for selectively controlling the operational functions of the aircraft comprising a plurality of jointly operable stepper switches, a first function-selecting switch effective when actuated while the stepper switches are in a first step position to raise the flaps and being further effective when actuated while the stepper switches are in a second step position to raise the landing gear, and a second function-selecting switch normally effective when actuated while the stepper switches are in a first step position to lower the flaps and being further normally effective when actuated while the stepper switches are in a second step position to lower the landing gear, means for enabling the second function selecting switch to control the lowering of both the landing gear and the flaps while the stepper switches are maintained in said second step position comprising a first relay operated once for each actuation of the second function-selecting switch, a second relay arranged to be operated and held energized through a holding circuit for a given operation of said first relay, said gear-operating means being controlled by said second relay for lowering the landing gear when said second relay is energized, and a third relay having contacts and mechanical latching means therefor and effective upon release of said first relay while said second relay is held energized through its holding circuit to actuate and latch said contacts, said flap-operating means being controlled by said third relay and effective upon operation of said first relay while said third relay is in a latched condition to lower the flaps of the aircraft.

2. In a system as set forth in claim 1, a fourth relay operated by actuation of the first function-selecting switch when the stepper switches are in said second step position to effect restoration of said second and third relays.

3. In a system for remotely controlling an aircraft or the like equipped with means alternatively operable for raising and lowering the landing gear of the aircraft and other means alternatively operable for raising and lowering the flaps of the aircraft, said system including means for selectively controlling the operational functions of the aircraft comprising jointly operable stepper switches, a first function-selecting switch effective when actuated while the stepper switches are in a first step position to raise the flaps and being further effective when actuated while the stepper switches are in a second step position to raise the landing gear, and a second function-selecting switch normally effective when actuated while the stepper switches are in said first step position to lower the flaps and being further normally effective when actuated while the stepper switches are in said second step position to lower the landing gear, means relating the second function-selecting switch to the flap-operating means and the gear-operating means whereby two successive actuations of the second switch while the stepper switches are in one predetermined step position are effective to lower the landing gear and flaps in sequence.

PETER R. MURRAY.

REFERENCES CITED

The following references are of record in the file of this patent:

UNITED STATES PATENTS

| Number | Name | Date |
| --- | --- | --- |
| 1,664,539 | Bryce | Apr. 3, 1928 |
| 1,957,672 | Saunders | May 8, 1934 |
| 2,008,909 | Hershey | July 23, 1935 |
| 2,082,725 | Simmons | June 1, 1937 |
| 2,277,579 | Burger et al. | Mar. 24, 1942 |
| 2,279,615 | Bugatti | Apr. 14, 1942 |
| 2,331,108 | De Ganahl | Oct. 5, 1943 |
| 2,347,847 | Schnell | May 2, 1944 |
| 2,362,827 | Joachim | Nov. 14, 1944 |
| 2,375,413 | Guenther | May 8, 1945 |